United States Patent Office 3,575,911
Patented Apr. 20, 1971

3,575,911
ADHESIVES
Richard L. Peterson, Hudson, Wis., assignor to Minnesota Mining and Manufacturing Company, St. Paul, Minn.
No Drawing. Original application Nov. 19, 1964, Ser. No. 412,329, now Patent No. 3,441,430, dated Apr. 29, 1969. Divided and this application June 19, 1968, Ser. No. 751,328
Int. Cl. C08f 45/24
U.S. Cl. 260—29.6          2 Claims

ABSTRACT OF THE DISCLOSURE

Water-soluble adhesive compositions are made by copolymerizing 60–95 parts of an acrylic acid and correspondingly 40 to 5 parts of a water-soluble homopolymerizable acrylate (e.g., 2-ethoxy ethyl acrylate), thereafter adding 100–200 parts of compatible liquid water-soluble ether plasticizer, up to 2 parts of strong alkali, and ½ to 3 parts of polyfunctional crosslinking agent.

---

This is a division of application Ser. No. 412,329, filed Nov. 19, 1964, now U.S. Pat. 3,441,430.

This invention relates to water soluble aggressively tacky adhesives and methods of making such adhesives.

Paper making and printing operations require splicing the end of one roll of paper to the beginning of another, as well as splicing together a roll after defective material is cut out. It is important that such splices be made quickly and easily, necessitating the use of an adhesive which rapidly attains maximum strength and which retains that strength throughout subsequent operations. So that the spliced areas, which are eventually cut out can be returned to the paper mill for reprocessing, it is extremely desirable that the splice, including the adhesive which is used to make it, be repulpable. This combination of requirements precludes the use of conventional normally tacky and pressure-sensitive rubber-resin adhesives.

The most popular paper-slicing tape prior to the present invention is described and claimed in Sohl U.S. Pat. 2,838,421, where adhesives are made from polyvinyl-carboxylic acids such as polyacrylic acid blended with a permanent plasticizer such as polyethylene glycol or polypropylene glycol. Double-coated paper tapes made with these adhesives are widely used in the paper making and printing industry today; although excellent in many respects, splices made with such adhesives show a tendency to "bleed" through succeeding laps of paper at conditions of high humidity or temperature. When this occurs, adjoining convolutions may become so tightly adhered together that the paper actually tears during processing. Attempts have been made to reduce bleeding by modifying the Sohl adhesive, e.g., by copolymerizing a lower alkyl acrylate with acrylic acid, but such adhesives have been found extremely difficult to repulp under typical field conditions. Some efforts have also been made to replace polyacrylic acid with such other water-soluble adhesives as polyvinylpyrrolidone, but these attempts have resulted in products which are inferior in both bleed-resistance and heat-resistance.

Like the Sohl adhesive, the present invention provides an elastic, rubbery product which adheres tenaciously to hydrophilic surfaces such as paper, even when those surfaces are wet. This invention also provides—for the first time, insofar as applicant is aware—a product which essentially eliminates the problems of waste paper and breakage caused by adhesive bleeding. The adhesive of this invention has high internal strength, maintaining that strength even at the elevated temperatures often attained in the curing of printing inks. Equally significantly, this adhesive and splicing tapes made therewith retain the essential quality of repulpability under conventional paper making conditions.

The invention includes a water-soluble humidity- and heat-resistant polymer made by copolymerizing 60 to 95 parts by weight of an α-β unsaturated monocarboxylic acid (especially acrylic or methacrylic acid) and correspondingly from 40 to 5 parts by weight of a water-soluble homopolymerizable alkoxy alkyl ester of such an acid (e.g., methoxy, ethyl, methoxy butyl or 2-ethoxyethyl acrylate, or polyoxyalkylene glycol ether acrylates). The polymerization reaction is carried out, in the manner conventional for polymerizing acrylic esters, using known catalysts and chain-transfer agents. The finished copolymer, in 15% solids solution, has a Brookfield viscosity at 80° F. in the range of 5,000 to 100,000 cps. The adhesive composition also includes from 100 to 200 parts by weight (based on 100 parts by weight of copolymer) of a compatible liquid water-soluble plasticizer having at least one ether linkage and an average molecular weight in excess of about 200; suitable materials include polypropylene glycol, polyethylene glycol, or, preferably, polyethylene glycol monophenyl ether. In order to provide improved heat resistance, the adhesive composition also preferably includes from about ½ to about 3 parts per 100 parts of copolymer of a polyfunctional crosslinker, e.g., water-soluble polyfunctional amines such as triethylene tetramine, diethylene triamine, or, preferably, hexamethylene diamine. The adhesive composition may also contain up to about 2 parts per 100 parts of copolymer of the hydroxide of a monovalent cation, e.g., sodium hydroxide, potassium hydroxide, or ammonium hydroxide. An aggressively tacky paper-adherent tape product is made by coating one or both sides of a sheet backing, especially a tissue paper backing, with a solution of this adhesive and evaporating the solvent.

The following examples are provided, not by way of limitation, but merely as illustrations of presently preferred embodiments of this invention.

EXAMPLE 1

A 2:1 water:acetone solution containing 12% acrylic acid and 3% ethoxyethyl acrylate is copolymerized in a glass-lined kettle, employing potassium persulfate as a catalyst and mercapto acetic acid as a chain transfer agent, so as to obtain a product solution containing about 15% solids and having a Brookfield viscosity in the range of 5,000 to 100,000 cps. at 80° F. Approximately 22.5 parts by weight of polyethylene glycol monophenyl ether having an average molecular weight of 270 (available commercially, as "Pycal 94," from the Atlas Powder Company) is then added at room temperature, while the copolymer solution is constantly stirred. To the composition is then slowly added approximately 0.25 part by weight of hexamethylene diamine (as a 70% solution in water) and approximately 0.25 part of NaOH; these alkaline materials neutralize sulphuric acid formed during the decomposition of the potassium persulfate catalyst; the diamine also serves as an effective crosslinker to impart strength to the adhesive used at high temperatures. If desired, a dye such as malachite green may be included in the composition in order to color the adhesive and make coatings thereof more readily visible. Total adhesive solids of this composition constitutes about 30% by weight of the solution. The adhesive composition can either be used per se or coated on a sheet backing material in conventional manner to form a tacky adhesive tape.

EXAMPLE 2

To one surface of a paper liner, coated on both sides with a silicone release agent, was applied approximately 8½ dry grains per 24 square inches, of the adhesive of Example 1, and the solvent evaporated by heating in a forced air oven for approximately 2½ minutes at 200° F.

An open wood fiber tissue paper having a basis weight of 8 pounds per papermaker's ream was then laminated to the dried tacky adhesive by passing the adhesive-coated liner and the tissue paper web through a set of squeeze rolls. The exposed paper surface of the laminate was then coated with approximately the same amount of adhesive, the solvent again evaporated, and the composite double-coated laminate wound on itself in roll form. The tape product of this example functions especially effectively in the preparation of splices in paper making and printing operations. Even after being subjected to temperatures of 400° F. the entire splice construction can be readily repulped in conventional equipment using conventional deinking and paper making chemicals and procedures.

When two strips of 1¼ inch unbleached 40 lb. kraft paper were joined with a 1 inch x 1¼ inch strip of the tape just described, it was found that the shear strength of the splice exceeded the tensile strength of the paper. When an identically made splice was subjected to a constant shearing force of 1 kilogram, the splice lasted approximately 7 times as long before failure as a splice made with the best previously known repulpable splicing tape. When splices were similarly evaluated at 400° F., it was found that splices made with the tape of this example lasted nearly 4 times as long before failure as splices made with the best previously known splicing tape.

The examples in the table, presented in tabular form, illustrate repulpable adhesive systems which may be made in accordance with the present invention, indicating the effect of various changes in composition on the finished product.

As previously indicated, those skilled in the art will be able to effect numerous changes in the practice of this invention. For example, as is well known, polymerization may be initiated by ultraviolet light, heat, a peroxide, instead of the potassium persulfate catalyst named. Likewise, conventional chain modifiers (or chain transfer agents) of the thiol, thio-organic acid, or similar families may be employed; generally speaking, as is well-known, the more of such agent added, the lower the average molecular weight of the product. Again, speaking in general terms, the lower the average molecular weight, the more fluent the product and the greater the necessity for employing a crosslinking agent. Products having appreciably less than about ½% crosslinking agent based on the copolymer generally tend to be unsatisfactory for applications where splices are subjected to high heat, as is common in the printing industry. Likewise, when the crosslinking agent is present in excess of about 3% water solubility of the adhesive is decreased, and splices tend to be insufficiently repulpable and/or insufficiently tacky, particularly after exposure to high temperature.

| | Copolymer | | | | Parts per 100 parts of copolymer | | | | |
|---|---|---|---|---|---|---|---|---|---|
| Ex. | Acid | Alkoxy alkyl ester | Acid:ester monomer ratio | Plasticizer | Plasticizer | Diamine crosslinker | Chain transfer agent | Alkali | Comments |
| 3 | Acrylic | 2-ethoxyethyl acrylate. | 95:5 | Polyethylene glycol monophenylether. | 150 | 2.2 | 0.02 | 1.6 | More hygroscopic than Example 1; suitable for high caliper open papers; excellent at elevated temperatures. |
| 4 | do | do | 90:10 | do | 150 | 2.2 | 0.01 | 1.1 | General purpose; excellent at both room and elevated temperatures. |
| 5 | do | do | 90:10 | do | 150 | 0.9 | 0.05 | 0.4 | Similar to 4 but more hygroscopic. |
| 5 | do | do | 89:20 | do | 150 | 0.9 | 0.01 | 0.4 | Similar to 1, but slightly more flexible at high temperatures. |
| 6 | do | do | 79:30 | do | 150 | 0.9 | 0.01 | 0.4 | Similar to 4. |
| 7 | do | do | 60:40 | do | 100 | 1.7 | 0.01 | 0.7 | Less hygroscopic than 1; suitable for dense and/or coated papers; excellent at room temperature. |
| 8 | Methacrylic | do | 90:10 | do | 200 | 0.5 | 0.01 | | General purpose; less hygroscopic than comparable adhesive made with acrylic acid monomer. |
| 9 | Acrylic | Methoxy butyl acrylate. | 80:20 | do | 200 | 2.2 | 0.03 | 1.6 | General purpose; less hygroscopic and more flexible than 1. |
| 10 | do | 2-ethoxy ethyl acrylate. | 89:20 | Polyethylene glycol, ave. MW=1,000. | 200 | 0.9 | 0.03 | 0.7 | Outstanding splice strength but less tack and greater tendency to bleed than 1. |
| 11 | do | do | 80:20 | Polypropylene glycol, ave. MW=425. | 200 | 0.9 | 0.03 | 0.7 | Similar to 10. |

When paper spliced with the tape product of this example is wound tightly into a roll, no noticeable bleeding of the adhesive to adjacent layers is detected, and the roll can be easily unwound even after several days' exposure to high humidity. The adhesive remains tacky and shows no tendency toward pastiness. When the best previously available tape product is similarly employed, high humidity causes bleeding to adjacent layers, especially with light weight or open papers. This bleeding not only causes waste of soiled paper; it also tends to bond adjacent laps of paper tightly together, often resulting in breakage and resultant down time when the roll is unwound.

Even after being subjected to temperatures of 200–400° F., splices made in accordance with this example can readily be repulped, using conventional equipment, chemicals, and paper making techniques. Paper sheets made from stock containing such repulped splices display no agglomerates of adhesive or splice material when examined under the microscope. When the repulped furnish is checked by adding methyl red solution, there are no localized areas where color change occurs, further substantiating the total repulpability of the splice.

Although the monophenyl ether of polyethylene glycol has proved to be especially satisfactory as a plasticizer for adhesives made in accordance with this invention, other compatible liquid water soluble plasticizers having at least one ether linkage and a molecular weight above about 200 may also be successfully employed. If the molecular weight of the plasticizer falls below about 200 (e.g., if diethylene glycol is employed), the adhesive tends to be too fluent, and excessive bleeding of splices occurs; this problem may be oviated either by the inclusion in the molecule of aromatic groups or employing a higher molecular weight, e.g., tetraethylene glycol or higher polyethers. The plasticizer is added in that amount which is sufficient to improve tack while maintaining adequate strength and bleed resistance. Generally speaking, lower molecular weight copolymers, or those having relatively higher amounts of alkoxy alkylester comonomer, may employ as little as 100 parts of platisicizer per 100 parts of copolymer; higher molecular weight copolymers, or those employing a less soluble acid comonomer, may require as much as 200 parts of plasticizer per 100 parts of copolymer. It has been found that 150 parts of plasticizer per 100 parts of copolymer is satisfactory in almost all all cases. Specific changes, however, may be made to adapt to specific conditions. For example, where extremely dense or dry paper is being spliced or where the humidity of the plant is extremely low, it may be desirable to increase the amount of plasticizer normally used.

Where acrylic or methacrylic acid is employed as the dominant comonomer, the other comonomer employed should itself be water soluble; if this precaution is not observed, the finished adhesive product itself is likely to be extremely difficult, if not impossible, to repulp. The higher the molecular weight of the ether ester monomer, the lower the quantity which should be employed to produce a satisfactory copolymer, but an increase in the number of ether linkages in the molecule tends to offset even this generalization. If less than 5% of the ether ester comonomer is employed, the water sensitivity and bleeding tendency of the finished adhesive is almost certainly too high; likewise, if over 40% of the ether ester comonomer is employed, the adhesive is mainly suitable for only extremely dense papers and is extremely difficult to repulp.

Although this invention has been particularly described with respect to a splicing tape for paper making and printing operations, it has been pointed out that the adhesive per se has other uses. Water-soluble adhesive labels may be applied to dishes, windows, or other surfaces which it is common to clean with aqueous solvents. Cloth garment labels coated with this adhesive may readily be washed from the garments to which they are affixed. Likewise, since the adhesive is substantially insoluble in most oils or similar hydrocarbon solvents, it may be employed in applications where conventional normally tacky and pressure-sensitive adhesive tapes prove unsatisfactory.

What I claim is:

1. A water-soluble adhesive composition made by reacting, in aqueous solution, in the presence of a catalyst which promotes acrylate polymerization and from 0.02 to 0.2 part of thiol chain transfer agent, 60 to 95 parts by weight of unsaturated organic acid selected from the class consisting of acrylic acid and methacrylic acid and 5 to 40 parts by weight of water-soluble homopolymerizable alkoxy-acrylate monomer to form a copolymer having a 15% solids Brookfield viscosity at 80° F. in the range of 5,000 to 100,000 centipoises, and thereafter adding, based on 100 parts of said copolymer, 100 to 200 parts of compatible liquid water-soluble ether plasticizer having a molecular weight in excess of 200, up to 2 parts of strong alkali, and from ½ to 3 parts of water-soluble diamine.

2. The method of making a water-soluble heat-resistant, humidity-resistant adhesive, which comprises reacting, in 15% solids aqueous solution, in the presence of a catalyst which promotes acrylate polymerization and a chain transfer agent, 60 to 95 parts by weight of acrylic acid and correspondingly 40 to 5 parts of 2-ethoxy ethyl acrylate to yield a copolymer solution having a viscosity of 5,000–100,000 cps. Brookfield at 80° F. and thereafter blending therewith, 100 to 200 parts of polyethylene glycol monophenyl ether, 0 to 2 parts of alkali metal hydroxide, and ½ to 3 parts of water-soluble polyfunctional crosslinking agent.

References Cited
UNITED STATES PATENTS

| | | | |
|---|---|---|---|
| 2,256,618 | 9/1941 | Kistler | 51—293 |
| 2,870,129 | 1/1959 | Merriam | 260—86.1 |
| 2,883,316 | 4/1959 | Leahy et al. | 260—86.1 |
| 2,945,013 | 7/1960 | Ott | 260—86.1 |
| 2,973,286 | 2/1961 | Ulrich | 260—86.1 |
| 3,184,440 | 5/1965 | Chadha et al. | 260—86.1 |
| 3,258,454 | 6/1966 | Vona | 260—86.1 |
| 3,361,587 | 1/1968 | Menikheim | 260—29.6TA |
| 3,367,889 | 2/1968 | Oline | 260—86.1 |
| 3,401,135 | 9/1968 | Sato | 260—29.6E |
| 3,441,430 | 4/1969 | Peterson | 117—68.5 |
| 3,488,331 | 1/1970 | Jorgensen | 260—86.1E |

JAY H. WOO, Primary Examiner

U.S. Cl. X.R.

260—86.1

UNITED STATES PATENT OFFICE
CERTIFICATE OF CORRECTION

Patent No. 3,575,911　　　　　　　Dated April 20, 1971

Inventor(s) Richard L. Peterson

It is certified that error appears in the above-identified patent and that said Letters Patent are hereby corrected as shown below:

In Columns 3-4, (table), Example 5, "89:20" should be -- 80:20 --; Example 6, "79:30" should be -- 70:30 --; Example 10, "89:20" should be -- 80:20 --.

Signed and sealed this 27th day of February 1973.

(SEAL)
Attest:

EDWARD M. FLETCHER, JR.　　　　　　　ROBERT GOTTSCHALK
Attesting Officer　　　　　　　　　　　Commissioner of Patents

FORM PO-1050 (10-69)